United States Patent
Jin et al.

(10) Patent No.: US 9,019,803 B1
(45) Date of Patent: Apr. 28, 2015

(54) LAMINATED PLASMON GENERATOR WITH CAVITY PROCESS

(71) Applicant: Headway Technologies, Inc., Milpitas, CA (US)

(72) Inventors: Xuhui Jin, San Jose, CA (US); Yoshitaka Sasaki, Los Gatos, CA (US); Hiroyuki Ito, Sunnyvale, CA (US); Shigeki Tanemura, Sunnyvale, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 14/268,407

(22) Filed: May 2, 2014

(51) Int. Cl.
  *G11B 11/00* (2006.01)
  *G11B 13/08* (2006.01)
  *G02B 5/00* (2006.01)
  *G02B 27/56* (2006.01)

(52) U.S. Cl.
  CPC .............. *G11B 13/08* (2013.01); *G02B 5/008* (2013.01); *G02B 27/56* (2013.01)

(58) Field of Classification Search
  None
  See application file for complete search history.

(56) References Cited

U.S. PATENT DOCUMENTS

| | | | |
|---|---|---|---|
| 8,036,069 B1 | 10/2011 | Jin et al. | |
| 8,059,496 B1 | 11/2011 | Zhou et al. | |
| 8,295,132 B2 | 10/2012 | Jin et al. | |
| 8,488,419 B1 | 7/2013 | Jin et al. | |
| 8,514,673 B1 * | 8/2013 | Zhao et al. | 369/13.33 |
| 8,576,674 B2 | 11/2013 | Sasaki et al. | |
| 8,578,593 B2 | 11/2013 | Tanaka et al. | |
| 8,599,656 B2 | 12/2013 | Jin et al. | |
| 8,711,663 B1 | 4/2014 | Sasaki et al. | |
| 8,830,799 B1 * | 9/2014 | Sasaki et al. | 369/13.33 |
| 8,867,170 B1 * | 10/2014 | Sasaki et al. | 360/125.3 |
| 2008/0192376 A1 | 8/2008 | Tanaka et al. | |
| 2010/0123965 A1 * | 5/2010 | Lee et al. | 360/59 |
| 2010/0315735 A1 | 12/2010 | Zhou et al. | |
| 2013/0107681 A1 | 5/2013 | Sasaki et al. | |
| 2013/0148485 A1 * | 6/2013 | Jin et al. | 369/13.17 |
| 2013/0279315 A1 * | 10/2013 | Zhao et al. | 369/13.33 |
| 2014/0050058 A1 * | 2/2014 | Zou et al. | 369/13.33 |
| 2014/0269237 A1 * | 9/2014 | Sasaki et al. | 369/13.24 |

OTHER PUBLICATIONS

Co-pending U.S. Appl. No. 13/942,074, filed Jul. 15, 2013, "Multilayer Plasmon Generator," by Yoshitake Sasaki, et al., 77 pgs.
Co-pending U.S. Appl. No. 13/846,278, filed Mar. 18, 2013, "Multilayer Plasmon Generator," by Yoshitake Sasaki, et al., 62 pgs.

\* cited by examiner

*Primary Examiner* — Brenda Bernardi
(74) *Attorney, Agent, or Firm* — Saile Ackerman LLC; Stephen B. Ackerman (57) ABSTRACT

A plasmon generator (PG) is disclosed with a laminated structure of non-planar X and Y layers formed between a waveguide and write pole. Each X layer is made of a noble metal such as Au while each Y layer is a non-noble metal or dielectric material to improve durability. As a result, the PG has a peg portion at an air bearing surface with improved reliability compared with pegs made entirely of a noble metal. Non-planarity of X and Y layers improves diffusion of Y material between X grains thereby minimizing X grain growth to enhance thermal stability. The laminated PG is formed by a process sequence that involves forming and filling a cavity, and concludes with a chemical mechanical polish process to form a planar top PG surface that faces a write pole leading side.

54 Claims, 8 Drawing Sheets

LAMINATED PLASMON GENERATOR WITH CAVITY PROCESS

RELATED PATENT APPLICATIONS

This application is related to the following: Ser. No. 13/777,488, filing date Feb. 26, 2013; Ser. No. 13/846,278, filing date Mar. 18, 2013; Ser. No. 13/942,074, filing date Jul. 15, 2013; and U.S. Pat. No. 8,488,419, all assigned to a common assignee and herein incorporated by reference in their entirety.

TECHNICAL FIELD

The present disclosure relates to magnetic read/write heads based on thermally assisted magnetic recording (TAMR) and in particular to a laminated plasmon generator (PG) structure and a cavity process for making the PG wherein a light optical mode from a waveguide is coupled to the propagating plasmon mode of the PG, and the resulting plasmon energy is projected to a spot on the media where localized heating occurs to facilitate a write process.

BACKGROUND

TAMR is expected to be one of the future generations of magnetic recording technologies that will enable recording at ~1-10 Tb/in$^2$ data densities. TAMR involves raising the temperature of a small region of the magnetic medium to near its Curie temperature where both of its coercivity and anisotropy are significantly reduced so that magnetic writing becomes easier to achieve even with weak write fields characteristic of small write heads in high recording density schemes. In TAMR, optical power from a light source is converted into localized heating in a recording medium during a write process to temporarily reduce the field needed to switch the magnetizations of the medium grains. Thus, with a sharp temperature gradient of TAMR acting alone or in alignment with a high magnetic field gradient, data storage density can be further improved with respect to current state of the art recording technology.

In addition to the components of conventional write heads, a TAMR head also typically includes an optical waveguide (WG) and a plasmon antenna (PA) or plasmon generator (PG). The waveguide serves as an intermediate path to guide external laser light from a source mounted on a back side of the slider to the PA or PG where the light optical mode couples to the local plasmon mode of the PA or to the propagating surface plasmon (SP) mode of the PG. After the optical energy is transformed to plasmon energy, either with local plasmon excitation in the PA or with energy transmission along the PG, it is concentrated at the medium location where heating is desired. Ideally, the heating spot is correctly aligned with the magnetic field from the write head to realize optimum TAMR performance.

However, in the prior art, alignment of the heated spot with the magnetic field from the write head on the magnetic medium has been difficult to achieve. Spot size is typically around 100 nm or greater which is significantly larger than the <50 nm size needed to make the first generation of TAMR devices with high optical efficiency.

Current technology encompasses a TAMR head structure that integrates an edge plasmon generator (EPG) with a triangular shape from a cross-sectional view. The shape edge of the triangular EPG is placed in the vicinity of an optical waveguide and supports a very confined edge plasmon mode. Through evanescent coupling, the optical energy in the WG can be efficiently transferred to EPG mode. The EPG transmits the plasmon energy toward the air bearing surface (ABS) and focuses the energy at a spot on the medium located underneath the EPG. Local confinement of the edge plasmon mode is determined by the angle that forms the EPG shape edge, the radius of the triangle corner, the noble metal composition of the EPG, and the dielectric material surrounding the tip. For a 25 nm tip radius, optical spot size in the medium is about 100 nm in full-width half maximum.

By using a plasmon shield formed proximate to the EPG tip at the ABS as we disclosed in U.S. Pat. No. 8,036,069, the optical spot on the medium can be further reduced. The optical spot size with a plasmon shield is related to the gap distance between EPG and plasmon shield and can be reduced to 50 nm with a gap distance less than 40 nm, for example. Although the optical spot size may be reduced to a range of 20-30 nm with a 10 nm gap distance, the optical efficiency is significantly lowered which requires a higher laser power. However, higher laser power is not desirable for various reasons including reliability concerns.

A better choice to obtain small and scalable optical spot size is to incorporate an isolated metallic feature called a peg at an end of a PG at the ABS. We have disclosed one example of a peg in US Patent Application 2013/0148485 that is described in more detail in a later section. At the ABS, the SP mode is confined around the free standing peg, and heats the media locally while the recording head flies over the media surface. Confinement of optical energy at the media surface depends on the peg dimensions, the spacing between the ABS and magnetic medium recording layer, and the thermal properties of the media layers. Therefore, optical spot size may be scaled down by fabricating a smaller peg surface area at the ABS. Although noble metals such as Au, Ag, and Cu and their alloys are often selected as the peg material, there is a corrosion issue with Ag and Cu when they are exposed to air. Furthermore Au is associated with a migration issue at temperatures well below its melting point. As a result, a PG with a peg portion made from a noble metal exhibits poor reliability during recording tests.

Other PG with different compositions are being developed. However, current technology does not provide a TAMR structure with a PG that allows for a narrow optical spot size of around 20 nm or less with good reliability, especially when the PG including the peg portion comprises Au or similar noble metals with high optical efficiency and low resistive heating. Therefore, a plasmon generator with an improved design is needed to enable high efficiency of optical energy transmission to the ABS, scalable spot size, and acceptable reliability.

SUMMARY

One objective of the present disclosure is to provide a plasmon generator composition and structure that affords greater reliability than is available in prior art PG designs.

A second objective of the present disclosure is to provide a process sequence for fabricating the PG structure according to the first objective that is readily implemented with existing materials and process steps.

These objectives are realized in embodiments of the present disclosure wherein a TAMR write head structure includes a write pole that has a plasmon generator (PG) formed proximate to a leading edge of a write pole tip region along the ABS. The plasmon generator extends a certain distance along a surface of the write pole towards the back end of the device. There is also an optical waveguide that is formed on an opposite side of the PG with respect to the write pole wherein the waveguide extends from the ABS in a lengthwise direction perpendicular to the ABS and parallel to the opposite side of the plasmon generator. The waveguide captures light from a light source near the back end of the device and propagates the light toward the ABS. A portion of the light energy is transferred to the plasmon mode along the PG by evanescent coupling and is then propagated to the ABS through a metal rod portion in the PG before being projected onto a magnetic medium for spot heating during a write process.

A key feature of the present disclosure is the composition and shape of the plasmon generator (PG). According to one embodiment, the PG has a structure that fills a cavity within a dielectric layer and has a planar top surface such that there is a uniform PG thickness in a down track direction. The PG includes a rod shaped portion hereafter referred to as a peg, and a second portion that is substantially in the shape of a triangle or parabola with a narrow front side facing the ABS and a wider back side that is parallel to the ABS from a top-down (down-track) view. The peg has a first width in a cross-track direction and extends a first length from a first end at the ABS to a second end where the peg adjoins the second PG portion along a plane that is parallel to the ABS. The second portion has a substantially greater width in a cross-track direction than the first width, and has a length between the second end and the back side that is greater than the first length.

In a preferred embodiment, the PG structure is comprised of a plurality of X layers and a plurality of Y layers that are laid down in an alternating fashion, and each has a top surface that is non-planar along a cross-track direction. In particular, a middle section of each X and Y layer has a top surface that is formed parallel to a substrate that is at the bottom surface of the cavity, while side sections of each X and Y layer proximate to the dielectric layer are formed parallel to a cavity sidewall that may be aligned 45 to 90 degrees with respect to the substrate. Preferably, the X layers are selected from one or more of Au, Ag, Cu, Al, and alloys thereof with other metals such as Co or Ni to provide high efficiency for light and plasmon mode transmission. The Y layers are selected from one or more of Ru, Cr, Pd, Pt, Ti, W, Ta, Mg, Fe, Co, Ni, Cu, Zr, Y or alloys thereof for low atom mobility, or may be made of a dielectric material such as $Ta_2O_5$, $Al_2O_3$, $SiO_2$, SiON, $Si_3N_4$, $Ti_2O_5$, and $HfO_2$.

A Y layer is used to separate two X layers to prevent X grain growth so that a smaller X grain size will lead to greater hardness and less density change at higher temperatures and thereby improve PG reliability. Moreover, the migration issue associated with high optical efficiency materials such as Au will be considerably reduced because of the lamination of X and Y layers. The thickness for each of the plurality of X layers ($X_1$, $X_2$, ... $X_n$) is from 5 nm to 70 nm, and the thickness of each of the Y layers ($Y_1$, $Y_2$, ... $Y_n$) is from 0.1 to 10 nm. Preferably, a thickness t1 of layer x1 is greater than the thickness h1 of layer y1, thickness t2 for layer x2 is greater than thickness h2 for layer y2, and so forth up to tn>hn.

The peg layer may have a rectangular shape from a top-down view wherein the two parallel sides that connect the first end to the second end are formed perpendicular to the ABS. Optical spot size on the magnetic medium may be scaled down by reducing the cross-track dimension and/or the down-track dimension of the peg at the ABS.

In a second embodiment, the peg has the laminated structure comprised of X and Y layers as previously described. However, the second portion may include a single layer of a third material that is one of the X metals formed on a rectangular section of the laminated X/Y structure that extends beyond the first peg end. In other words, the second portion retains the substantially triangular or parabolic shape from the first embodiment, but has a down-track thickness greater than the thickness of the peg portion. Furthermore, a top surface of the second portion is thicker in a region above the rectangular (rod-like) X/Y layer than in a side region formed directly on the substrate and that does not cover the peg. As a result, the side regions adjoin the sides of the rod-like X/Y layer that extends beyond the peg end, and the side regions have a bottom surface that is coplanar with the bottom surface of the peg and rod-like layer. The second portion is recessed from the ABS by 5 to 150 nm.

In another embodiment, the write pole is imbedded in side heat sinks made of a high thermal conductivity material that adjoins both sides of the write pole at the ABS. Moreover, there may be a top heat sink formed on portions of the side heat sinks and on a trailing side of the write pole.

The present disclosure is also a method of fabricating a laminated PG structure with non-planar X and Y layers in a TAMR head. The PG structure of the first embodiment is made by a sequence wherein a dielectric layer is deposited on a substrate and a cavity is formed therein that has the rectangular shape of the peg and a substantially triangular or parabolic second PG portion. A first X layer with thickness t1 is deposited that conforms to the bottom and sides of the cavity. Thereafter, a first Y layer with thickness h1 is conformally deposited on the first X layer. After the desired number of X and Y layers are laid down in alternating fashion and completely fill the cavity, a chemical mechanical polish (CMP) process is performed to form a smooth PG top surface that is coplanar with the surrounding dielectric layer. Thereafter, a conventional fabrication sequence may be followed where a main pole layer with a pole tip is formed above the PG structure.

BRIEF DESCRIPTION OF THE DRAWINGS

FIGS. 12*a*-14*a* are cross-sectional views depicting the successive deposition of layers to form the PG structure that fills the cavity in FIG. 11*a* according to an embodiment of the present disclosure.

FIGS. 12*b*-14*b* are cross-sectional views along a plane formed perpendicular to the ABS that depict the successive deposition of layers to form the PG structure that fills the cavity in FIG. 11*b*.

FIGS. 16*a*-21*a* and FIGS. 16*b*-21*b* are ABS views and top-down views, respectively, that illustrate a sequence of steps used to fabricate a non-planar PG with a laminated peg according to a second embodiment of the present disclosure.

DETAILED DESCRIPTION

The present disclosure is a laminated plasmon generator wherein non-planar metal layers of high optical transmission material are laid down in alternating fashion with metal layers that are resistant to corrosion and mechanical wear, or with dielectric layers. The plasmon generator (PG) fills a cavity within a dielectric layer and preferably has a narrow peg portion also called a peg with a rectangular shape between a first end at the ABS and a second end at a first distance from the ABS. There is a second PG portion that adjoins the second peg end and becomes gradually wider in the cross-track dimension with increasing distance from the ABS until reaching a back side. The peg confines a narrow diameter portion of the near field of the surface plasmon mode onto the recording medium during a thermally assisted write process. Peg dimensions may be reduced to narrow the spot size on the media and provide scalability to higher areal density devices. The terms surface and side may be used interchangeably when referring to a TAMR component such as a waveguide or PG. A top surface of a TAMR component is defined as one that is facing a main pole layer. The TAMR write head may be part of a combined read head/write head design as appreciated by those skilled in the art. The present disclosure also includes a process sequence for making a laminated PG with non-planar layers. In all drawings, the y-axis represents the down-track direction, the z-axis is the cross-track direction, and the x-axis extends in a direction perpendicular to the ABS towards a back end of the device.

Figure 1A:
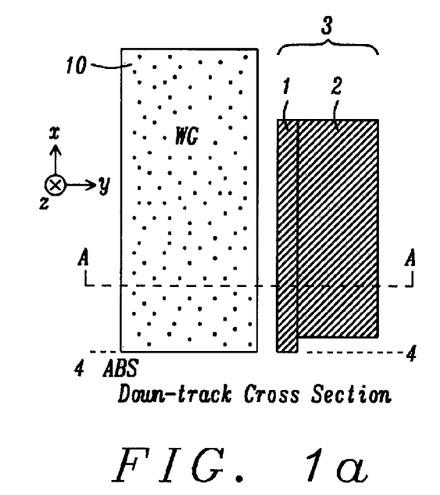
FIGS. 1a-1b are different views of a plasmon generator structure with a stack of two layers previously fabricated by the inventors.
Figure 1B:
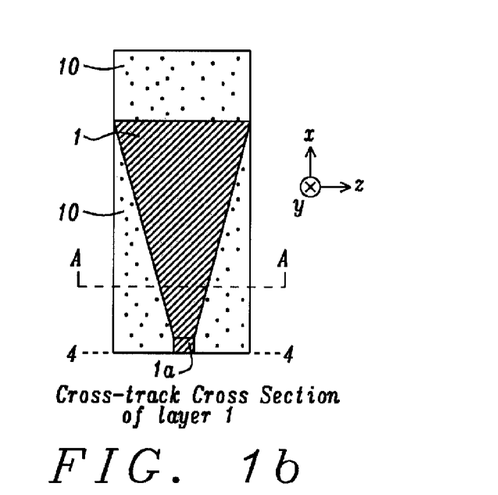

Referring to FIG. 1*a* and FIG. 1*b*, a down-track cross-sectional view and cross-track cross-sectional view, respectively, are provided of a plasmon generator 3 consisting of metal layers 1, 2 as previously disclosed by the inventors in related patent application US 2013/0148485. Optical spot size on the recording medium (not shown) is reduced by shrinking the physical size of a peg 1*a* located at the end of a first metal layer 1 at the ABS 4-4. A first layer 1 has a bottom side facing the waveguide 10 while the recessed second layer 2 is formed on a top side of the first layer and faces the write pole (not shown). Thus, the plasmon mode (not shown) generated by PG 3 is focused to a small spot at the ABS by the peg 1*a* in FIG. 1*b*. However, we observed that a PG made entirely of noble metals, especially Au and Cu, suffers from a corrosion issue when exposed to the air at the ABS. Moreover, Au experiences a migration issue at temperatures well below its melting point. As a result, the PG 3 exhibits inadequate reliability during recording tests.

In US 2013/0107681 and U.S. Pat. No. 8,488,419, we disclosed the use of more chemically and mechanically robust metals such as Cr, Ti, Ru, Co, Ni, and other metals to improve PG reliability. However, a PG structure where only the peg portion is replaced by a more robust metal is very challenging to manufacture. Moreover, the interface between a lower layer 1 made of a noble metal, and a peg 1*a* constructed with a non-noble metal may lead to a discontinuity issue and thereby degrade plasmon generator performance. In U.S. patent application Ser. No. 13/777,488, we proposed a stitched PG structure to improve TAMR head reliability.

Figure 2:
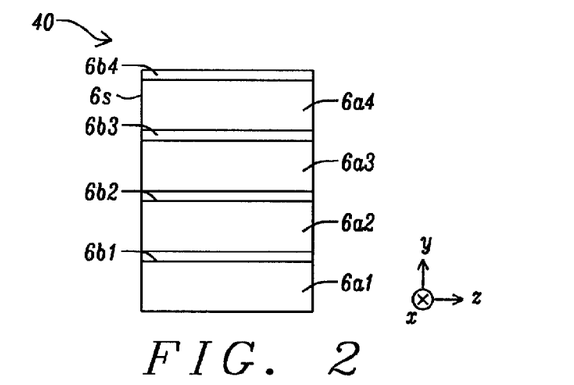
FIG. 2 shows a cross-sectional view of a peg portion of a laminated plasmon generator (PG) with planar layers formed by a method previously practiced by the inventors.

Referring to FIG. 2, in U.S. patent application Ser. Nos. 13/846,278 and 13/942,074, we described the formation of a laminated PG structure 40 made of planar layers wherein Au layers 6*a*1-6*a*4 alternate with second metal (M2) layers 6*b*1-6*b*4. In this design, a laminated stack of Au and M2 layers is deposited and then milled to fabricate sidewalls 6*s* and arrive at the desired PG shape. Subsequently, a dielectric layer (not shown) is deposited and contacts the sidewalls of PG 40.

Herein we disclose additional improvements in our plasmon generator design that will improve reliability without compromising optical spot size scalability or optical efficiency. Similar to the aforementioned Au/M2 laminate, layers of a first metal X selected for high optical efficiency, and low resistive heating are laminated with a second material Y that is a more robust metal or a dielectric layer. According to a preferred embodiment, metal X is selected from Au, Ag, Cu, Al, and alloys thereof with Co or Ni, for example, for the purpose of generating surface plasmon with high efficiency due to a high density of free electrons in these metals and alloys. Au is especially preferred for TAMR devices because of a relatively high optical efficiency, low absorption and resistive heating for laser light with wavelengths in the range of 800-1000 nm, and good chemical stability. Although Au is mechanically soft and easily flows at elevated temperatures during TAMR operations, this potential reliability issue is addressed by selection of an appropriate Y material and by the non-planarity of laminated X/Y layers.

The material for the Y layers comprises one or more of Ru, Cr, Pd, Pt, Ti, W, Ta, Mg, Fe, Co, Ni, Cu, Zr, Y, or is a dielectric material such as $Ta_2O_5$, $Al_2O_3$, $SiO_2$, SiON, $Si_3N_4$, $Ti_2O_5$, and $HfO_2$. A Y layer separates successive X layers in a configuration represented by $X_1/Y_1/X_2/Y_2 \ldots /X_n$ or $X_1/Y_1/X_2/Y_2 \ldots /X_n/Y_n$, and the Y material is selected for its ability to diffuse into grain boundaries of metal X and thereby prevent metal X grain growth. As a result, there will be a smaller metal X boundary which in turn causes less density change at elevated temperatures and a more stable metal X layer. It should be understood that the metal or alloy in the first X ($X_1$) layer may be different from the metal or alloy in the second X ($X_2$) layer, or in a subsequent $X_n$ layer of a laminated structure. Likewise, the material in a first Y ($Y_1$) layer may differ from the material in a second Y ($Y_2$) layer, or in a subsequent $Y_n$ layer.

The laminate with non-planar X and Y layers in the present disclosure is considered to have an advantage over a laminate with planar layers because for a given peg volume and a certain number of "n" X and Y layers, there will be a greater area of contact between X and Y layers in the non-planar design. In other words, as the size of the interfacial region along X-Y boundaries increases, there will be a larger amount of Y diffusion between X grain boundaries to segregate X grains and thereby limit metal X grain growth. In planar laminates, there are X/Y interfaces only along a cross-track direction. However, in non-planar laminates as described herein, there are X/Y interfaces in both the cross-track and down-track directions thereby preventing grain growth in horizontal and vertical directions. As a result, metal X grains will be denser and more stable to provide better write head reliability. Obviously, as the number of X and Y layers increases in the laminated PG, thermal stability is expected to improve. However, the number of laminations "n" is preferably limited to the range of 2 to about 10 because of the increased amount of process time and production cost associated with higher values for "n".

Figure 3:
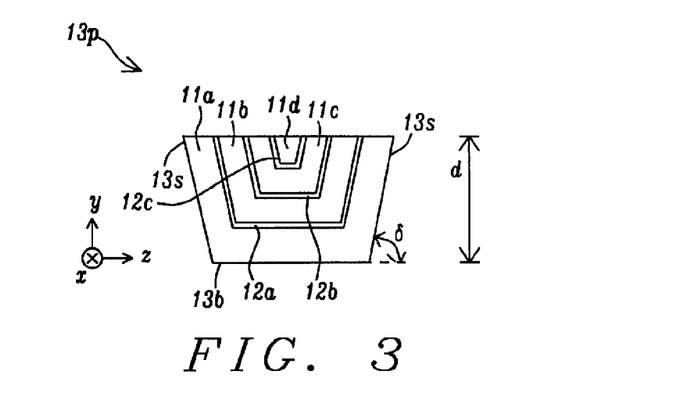
FIG. 3 is an ABS view of the peg portion of a laminated PG formed according to a first embodiment of the present disclosure wherein layers are non-planar.

Referring to FIG. 3, a cross-section of a peg portion in a planar PG is shown from an ABS view with surrounding layers removed. Although only peg portion 13p is depicted, a second PG portion that is out of view behind the peg has the same thickness d as the peg and the same number of laminated X and Y layers. In the exemplary embodiment, four metal X layers 11a-11d are shown that alternate with three material Y layers 12a-12c. However, in other embodiments, the number "n" of X layers in the laminate may vary from 2 to 10 while the number of Y layers may be equal to n or "n−1". Each of the layers in FIG. 3 has a center section that is formed parallel to a bottom surface 13b and side sections that are substantially parallel to one of the sides 13s. Peg sides may form an angle δ of 45 to 90 degrees with respect to bottom side 13b. Each X layer has a thickness from 5 to 70 nm, and each Y layer has a thickness from 0.1 to 10 nm. In another embodiment (not shown) with "n" X and "n" Y layers, a thickness t1 for a first X layer is greater than a thickness h1 for a first Y layer, thickness t2 for a second X layer is greater than thickness h2 for a second Y layer, and so forth up to thickness tn for the nth X layer is greater than thickness hn for the nth Y layer. Moreover, the thickness of the first X layer is preferably thicker than that of the other X layers such that t1>t2, t1>t3, and so forth up to t1>tn. Preferably, t1 is at least 20 nm since it is believed that the surface plasmon field extends up to 20 nm into the bottom portion of the PG. Higher optical efficiency, less absorption, and less resistive heating is realized when the surface plasmon field is transmitted by an X layer rather than a Y layer. In general, Y layer thickness is minimized to take advantage of the higher optical transmission and lower heating in X layers compared with Y layers. However, each Y layer should be sufficiently thick to provide a significant improvement in thermal stability and reliability for the peg.

Although peg 13p is depicted with an ABS shape in the form of a trapezoid where sides 13s are inclined with respect to the y-axis, and a top surface has a greater length in a cross-track (z-axis) direction than the bottom surface 13b, the present disclosure also encompasses other peg shapes. For example, the peg may have a rectangular or square shape where δ is 90 degrees, or the peg may have another polygonal shape at the ABS.

Figure 4A:
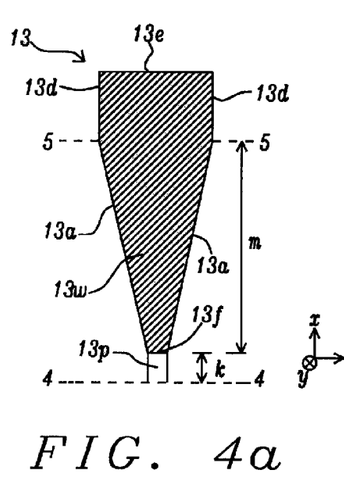
FIG. 4a is a top-down (down-track) view of the PG in FIG. 3 with a peg portion at the ABS and a second adjoining portion with a substantially triangular shape.
Figure 4B:
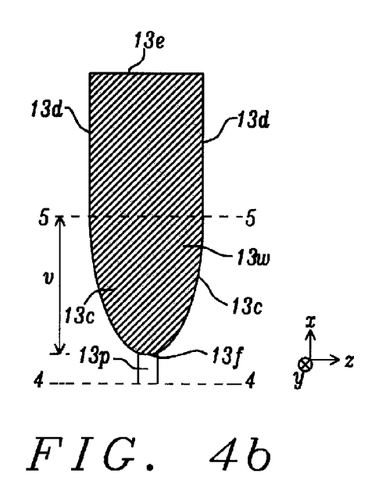
FIG. 4b is a top-down (down-track) view of the PG in FIG. 3 with a peg portion at the ABS and a second adjoining portion with a substantially parabolic shape.

From a top-down view in FIGS. 4a-4b, the second PG portion 13w has a substantially triangular shape or a substantially parabolic shape, respectively, with a front side 13f that is recessed a first distance k of about 5 to 150 nm from the ABS 4-4. The triangular or parabolic shape directs the plasmon energy generated along the surfaces of the second PG portion to the peg where the plasmon energy is in turn propagated to the ABS. Peg 13p has a rectangular or rod-like shape with a first end at the ABS and a second end that adjoins front side 13f. Note that individual X and Y layers are not depicted in order to clearly show the PG shape. In FIG. 4a, triangular sides 13a of the second PG portion may terminate at a plane 5-5 that is parallel to the ABS and is a second distance m from front side 13f where m is substantially greater than k. According to one embodiment, there are parallel sides 13d that extend from plane 5-5 to a back side 13e. Optionally, sides 13d may be omitted such that back side 13e lies along plane 5-5.

In the FIG. 4b embodiment, second PG portion 13w has two curved sides 13c that extend from a front side (tip) 13f to a plane 5-5 located a distance v from the front side and thereby define a parabolic shape. Preferably, v is substantially greater than k. The present disclosure anticipates there may be two parallel sides 13d extending from plane 5-5 to a back side 13e similar to the FIG. 4a embodiment. However, sides 13d may be omitted. In both of the aforementioned embodiments, the cross-track width (z-axis dimension) becomes increasingly larger with increasing distance from front side 13f until reaching plane 5-5. In addition, cross-track width is substantially greater for second PG portion 13w than for peg 13p.

Overall head reliability will be improved relative to prior art PG structures where the peg is made entirely of a noble metal because the Y layers in the laminated X/Y stack will provide resistance to corrosion and mechanical wear. Moreover, the laminated PG of the present disclosure is expected to be easier to fabricate compared with earlier PG structures that have a peg made of one metal and a second PG portion made of a second metal.

Figure 5:
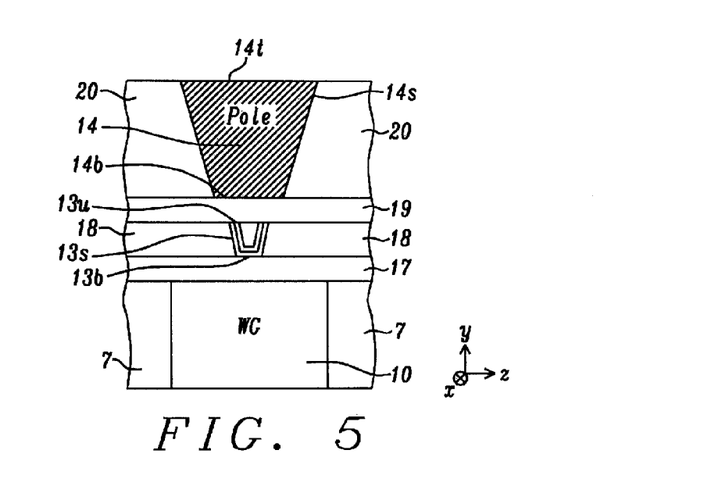
FIG. 5 is an ABS view showing a laminated PG formed within a cladding layer and with a top surface facing a write pole, and with a bottom surface facing a waveguide according to an embodiment of the present disclosure.

Referring to FIG. 5, an ABS view of a TAMR write head having a PG formed according to the present disclosure is shown wherein the peg with sides 13s is between a write pole 14 and a waveguide 10. In particular, a bottom peg surface 13b contacts a first gap layer 17 that is formed on the waveguide, and a top peg surface 13u contacts a second gap layer 19 formed between the PG and a leading edge 14b of write pole 14. The thickness of gap layer 17 may be from 5 to 50 nm and gap layer 19 may have a thickness from 5 to 80 nm. As the peg cross-track and down-track dimensions are scaled to smaller values, the thickness of one or both of gap layers 17, 19 is preferably decreased as well to maintain optimal heating on the track being written to on the magnetic medium.

In one aspect, the write pole has a trapezoidal shape at the ABS with a leading edge 14b having a smaller cross-sectional width than that of a trailing edge 14t, but other write pole shapes are compatible with the PG structure described herein. In this case, the leading side of the write pole includes leading edge 14b, the trailing side includes trailing edge 14t, and both leading and trailing sides may extend perpendicular to the ABS toward a back end of the TAMR device. However, the present disclosure anticipates that one or both of the write pole's leading and trailing sides may be tapered such that the top and bottom write pole surfaces are not parallel to a waveguide top surface. Sidewalls 14s connect top and bottom surfaces of the write pole. The trailing edge is part of the trailing side of the write pole as it moves in a y-axis direction over a magnetic medium during a write process. The peg is formed by a cavity process that is described in a later section.

According to the exemplary embodiment, waveguide 10 is formed within a first dielectric layer 7. Gap layers 17 and 19 are comprised of a dielectric material with a low refractive index such as alumina, silicon oxide, silicon oxynitride (SiON), or MgF$_2$ to optimize the transmission of the surface plasmon (SP) mode. Peg sides 13s adjoin a cladding layer 18 that may be made of the same dielectric material as in gap layer 17. Preferably, a top surface of the waveguide is coplanar with the first dielectric layer, and top surface 13u is coplanar with cladding layer 18 to provide a uniform thickness in layers 17-19 that enables better process control when fabricating a planar PG. Write pole 14 may be formed in a second dielectric layer 20 with a top surface 14t that is essentially coplanar with a top surface of layer 20.

Figure 6:
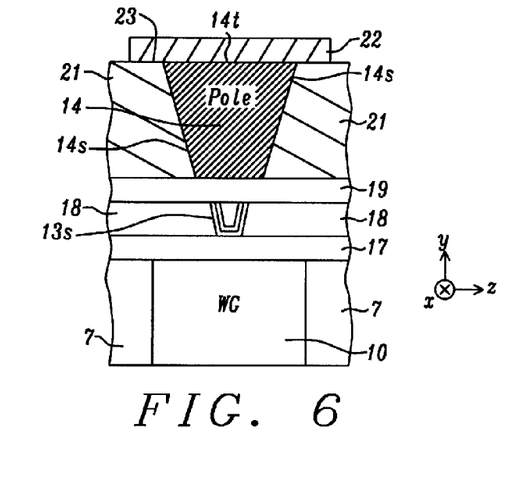
FIG. 6 is an ABS view of the write head structure in FIG. 5 wherein heat sinks adjoin the sides and a top surface of the write pole according to another embodiment of the present disclosure.

In an alternative embodiment depicted in FIG. 6, the write head retains the structure from the previous embodiment except the second dielectric layer 20 is replaced with side heat sinks 21 that contact write pole sides 14s and preferably have a thickness in a down-track direction equal to the write pole thickness. Moreover, there may be a top heat sink layer 22 that covers the write pole trailing side including trailing edge 14t, and the top heat sink also adjoins side heat sink layers 21 along an interface 23 that is proximate to sides 14s. The heat sinks 21, 22 are preferably comprised of high thermal conductivity materials such as one or more of Au, Cu, Cr, Ti, Ta, Ru, Pt, Pd, and SiC, and may extend 200 to 1000 nm from the ABS towards the back end of the device.

Figures 7A, 7B:
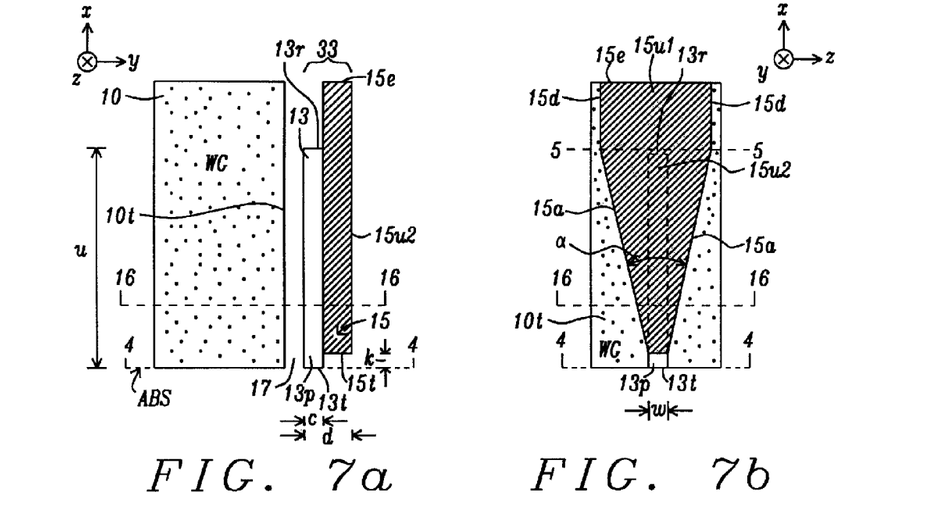
FIGS. 7a-7b depict a cross-sectional view and top-down view, respectively, of another PG embodiment of the present disclosure where a rod-like layer including a peg faces a waveguide and a second PG layer covers the sides and top surface of the rod-like layer except over the peg.

In a second PG embodiment of the present disclosure shown in FIGS. 7a-7b that represents a non-planar PG structure, the peg portion of the PG 33 has the planar laminated structure comprised of non-planar X and Y layers as previously described, and is part of a laminated rod-like layer 13 that is aligned perpendicular to the ABS in an x-axis direction. The second PG portion 15 is recessed a first distance from the ABS and covers the sides and top surface of the rod-like layer except over the peg. The second PG portion is preferably a single layer of one of the metal X materials such as Au in order to enhance plasmon transmission along the main body of the PG. Thus, the second PG portion retains the substantially triangular or parabolic shape from a top-down view similar to the first embodiment, but has a down-track thickness greater than the thickness of the peg portion. Furthermore, a top surface of the second PG portion may be a greater distance from the waveguide (and closer to the write pole leading side) in a region above the rod-like laminated layer than in a side region that does not cover the rod-like layer.

Referring to FIG. 7a, a down-track cross-sectional view is shown wherein the optical features of the write head include a waveguide 10 that abuts the ABS 4-4 and has a lengthwise dimension in an x-axis direction, and the PG 33. The waveguide has a top surface 10t that is separated from a bottom surface of rod-like layer 13 including peg 13p by a gap 17 that was previously described. The rod-like layer has a thickness c in a down-track direction, and long parallel sides extending from a tip 13t at the ABS to a back end 13r. The second PG portion is a layer 15 made of a metal X as described earlier that adjoins the top surface and two long parallel sides of the rod-like layer. Total thickness of the PG is d in a down-track direction where d>c. Preferably, the d/c thickness ratio is from 2:1 to 5:1 where c and d are both measured along a plane 16-16 that is perpendicular to top surface 10t and to metal X layer top surface 15u2. The peg 13p extends a distance k from the ABS and along the x-axis direction as in the first embodiment. Unlike the first embodiment, the rod-like shape in FIGS. 7a-7b continues a distance u to an end 13r that is a considerable distance greater than k. In the exemplary embodiment, both metal X layer 15 and waveguide 10 extend beyond the end 13r in an x-axis direction. Metal X layer has a back end 15e, and a front end 15t that is recessed from the ABS 4-4 by a distance k of 5 to 150 nm.

With regard to the top-down view in FIG. 7b, rod-like layer 13 has a rectangular shape and a width w in a cross-track direction along the z-axis. Current technology enables c and w dimensions as small as about 20 nm but the present design is expected to be scalable to at least 10 nm for c and w as technology improves and smaller images are fabricated with photoresist patterning and etching steps as explained in a later section. Although the waveguide is shown having a greater width in the cross-track direction than a back end 15e of the metal X layer, the present disclosure also anticipates an alternative embodiment wherein the metal X layer 15 has a larger cross-track width than that of waveguide 10. A portion of metal X layer top surface 15u2 is formed above rod-like layer 13, but the bulk of the top surface 15u1 is not above the rod-like layer. According to one embodiment, two sides 15a extend from a front side 15t to plane 5-5 such that the cross-track dimension of layer 15 becomes greater with increasing distance from the ABS. There may be two sides 15d aligned along the x-axis direction that connect an end of sides 15a to a back side 15e. However, sides 15d may be omitted. As a result, layer 15 has a substantially triangular shape. The vertex angle α formed by the two sides 15a varies from about 10° to 60°.

The substantially triangular shape serves to concentrate plasmon energy (surface plasmon mode) at the peg 13p and tip 13t at the ABS. Plasmon energy (not shown) is propagated along the bottom surface of PG 33 and along sides 15a and 15d toward the ABS and finally along the sides of peg 13p before reaching the ABS 4-4. In an alternative embodiment, the plane 5-5 where the sides 15a connect with sides 15d may be formed a distance less than u from the ABS and closer to the ABS than rod-like layer end 13r.

Figure 8A:
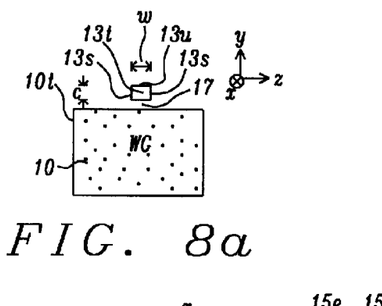
FIGS. 8*a*-8*b* show cross-sectional views of the FIG. 7*b* structure at the ABS and along a plane that is recessed from the ABS.

Referring to FIG. 8a, a cross-sectional view of the tip 13t in FIG. 7b is shown from an ABS perspective. According to one embodiment, tip 13t has a square or rectangular shape with two parallel sides 13s aligned in a down-track direction, a top surface 13u, and a bottom surface that is separated by gap 17 with a thickness of around 5 to 50 nm from a top surface 10t of the waveguide 10. The gap 17 is comprised a dielectric material with a low refractive index such as alumina, silicon oxide, silicon oxynitride (SiON), or MgF$_2$ to optimize the transmission of the surface plasmon (SP) mode. The peg 13p including tip 13t has a width w and a thickness c. In another embodiment, the peg may have another polygonal shape such as the trapezoid structure shown in FIG. 3 wherein a top surface has a greater cross-track length than the bottom surface 13b.

Figure 8B:
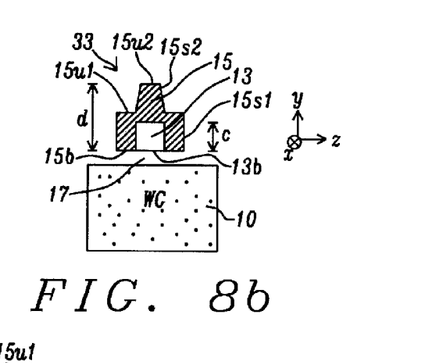

In FIG. 8b, a cross-sectional view is shown of PG 33 and waveguide 10 along the plane 16-16 in FIG. 7b. PG 33 has a planar bottom surface (facing the waveguide) that is comprised of rod-like layer bottom surface 13b and a bottom surface 15b of metal X layer 15 that is formed along opposite sides 13s of rod-like layer 13. Plasmon energy (not shown) is propagated along bottom surfaces 13b, 15b and along sides 15s1 toward the ABS. Metal X layer 15 has two side portions having a top surface 15u1 and sidewalls 15s1 that adjoin sides 13s of the rod-like layer 13. Besides being an excellent optical transmission material, layer 15 serves to suppress all but the fundamental SP mode propagating along the bottom surface 15b and converging on the peg 13p at the ABS. There is also a third portion of the metal X layer having a top surface 15u2 and sidewalls 15s2 that is formed above a top surface of rod-like layer 13. The maximum thickness d of PG 33 is from bottom surface 13b to top surface 15u2. It should be understood that sidewalls 15s2 are only evident in conditions where the d/c thickness ratio is near 2:1. When the d/c thickness ratio increases to around 3:1 to 5:1, then the top sides 15u1, 15u2 form a continuous curved top surface 15u3 as depicted in FIG. 10b.

The SP mode is propagated along PG 33 to the ABS where it is confined around the peg 13p and is projected onto the media to heat the media locally while the head flies over the media surface (not shown). The optical spot on the media can be scaled down by reducing one or both of thickness c and width w. Confinement of optical energy in the media depends on the dimensions and composition of the peg 13p, the spacing between tip 13t and the media recording layer (not shown), and the properties of the media.

The second embodiment retains the advantages of the first embodiment in that a peg with non-planar and laminated X and Y layers offers improved reliability over peg structures in the prior art. Furthermore, an additional advantage is realized with the metal X overcoat layer 15 in the second embodiment because additional plasmon mode efficiency is realized when the main body of the PG is substantially made of a metal X layer. In addition, the rod-like layer extends at least a few hundred nm from the ABS and below the overlying metal X layer which means the laminated X/Y layer 13 will be easier to fabricate than in prior art designs where the peg has a first composition and the remainder of the PG has a second composition. In other words, a long rod-like layer is more easily fabricated than a short peg layer.

Figure 9:
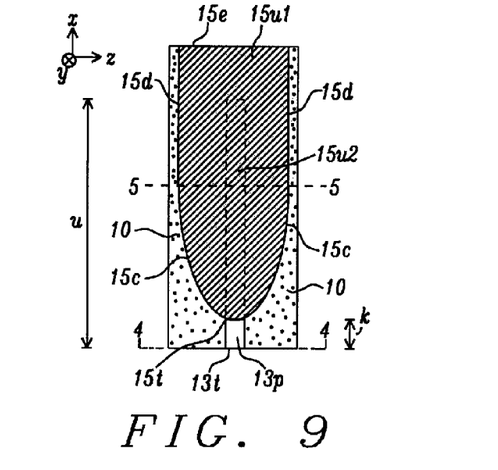
FIG. 9 depicts a top-down view of an alternative embodiment to the FIG. 7*b* design wherein the substantially triangular shape of the second PG layer is replaced by a substantially parabolic shape.

As shown in FIG. 9, the substantially triangular shape of layer 15 may be replaced by a parabolic shape wherein curved sides 15c converge to a tip 15t that is recessed from the ABS by a distance k of 5 to 150 nm. Therefore, the width in a cross-track direction (along the z-axis) of the front section of metal X layer 15 becomes increasingly greater as the distance from the ABS increases to a plane 5-5 where sides 15c adjoin two sides 15d aligned along an x-axis direction. Sides 15d terminate at back side 15e. In another aspect of this embodiment, sides 15d may be omitted such that back side 15e is formed along plane 5-5. Moreover, curved sides 15c may extend to a length greater than u from the ABS such that the plane 5-5 does not intersect the rod-like metal layer 13.

Figure 10A:
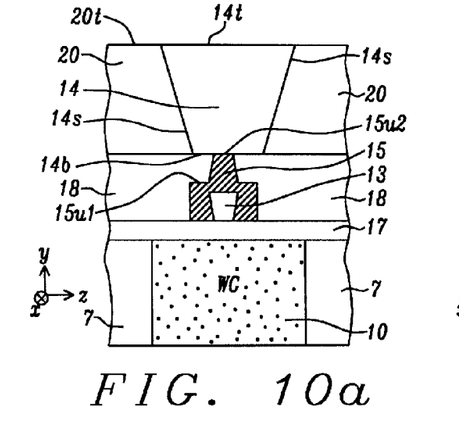
FIGS. 10*a*-10*b* are cross-sectional views of the PG in FIG. 7*b* or FIG. 9 that is formed between a waveguide and a write pole according to embodiments of the present disclosure.
Figure 10B:
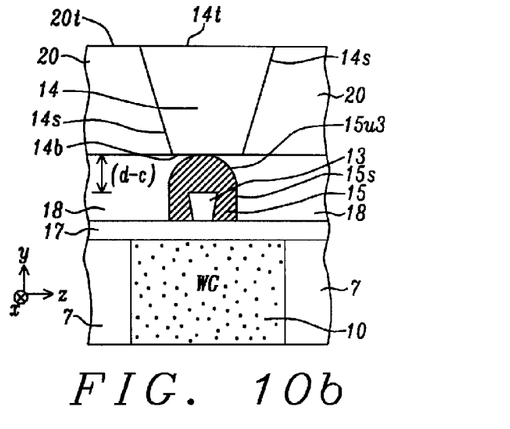

Referring to FIG. 10a, the optical structure depicted in FIG. 7b is shown in a cross-sectional view along plane 16-16 after a write pole is formed above PG 33. According to a preferred embodiment, top surface 15u2 formed above rod-like layer 13 contacts a portion of the leading side in write pole 14 including leading edge 14b. Although the close proximity of rod-like layer 13 (and peg 13p) to write pole 14 is preferred for better alignment of the optical heating spot to the magnetic track written to on the magnetic medium, a consequence of the direct contact of metal X layer 15 to leading edge 14b is heating of write pole 14. Therefore, the present disclosure encompasses an embodiment wherein second dielectric layer 20 is replaced by heat sinks 21, 22 similar to the design in FIG. 6. In another aspect illustrated in FIG. 10b, top surface 15u1/15u2 of layer 15 may be replaced by a continuous curved surface 15u3 in the form of an arc where an uppermost section of the top curved surface contacts the leading side 14b of the write pole 14. In both FIG. 10a-10b, a top surface 20t of dielectric layer 20 is preferably coplanar with trailing side 14t. Gap layer 19 may be omitted but there still remains a gap distance (d-c) in cladding layer 18 between a top surface of peg 13p and leading edge 14b at the ABS.

The present disclosure also encompasses a method of fabricating a laminated stack of non-planar X and Y in a planar PG structure. FIGS. 11a-15b show a process flow relating to successive steps of forming a cavity in a dielectric (cladding) layer, depositing the X and Y layers, and then forming a planar top PG surface.

Figure 11A:
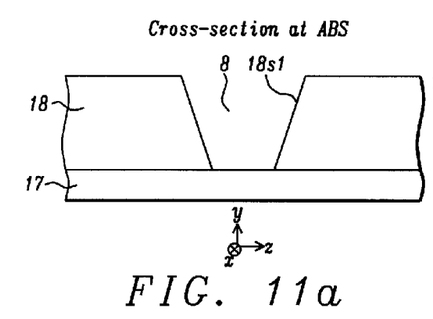
FIG. 11*a* is a cross-sectional view showing a fabrication step for a planar PG of the first embodiment where a cavity is formed in a dielectric layer.

Referring to FIG. 11a, the process sequence begins with a substrate such as a first gap layer 17 formed on a waveguide (not shown) that has been prepared by a conventional process up to this point. According to a preferred embodiment, cladding layer 18 described previously is deposited on first dielectric layer 17. Thereafter, an opening also referred to as a cavity 8 is formed by first coating a photoresist layer (not shown) on a top surface of layer 18, and then patternwise exposing and developing the photoresist layer to generate a cavity in the desired shape of the PG structure. The cavity in the photoresist layer is transferred through cladding layer 18 by a reactive ion etch (RIE) or ion beam etch (IBE) method. Then, the photoresist layer is removed by a well known process. As a result, opening 8 in the cladding layer has the desired peg shape.

Figure 11B:
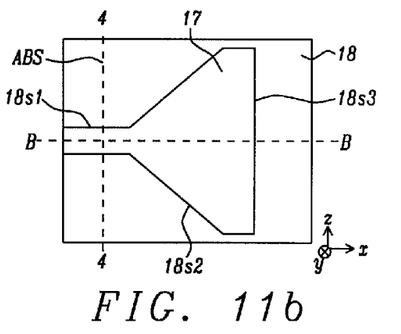
FIG. 11*b* is a top-down view along a down-track direction of the cavity in FIG. 11*a* that shows the desired shape of the peg and second portions to be deposited in a subsequent step.

In the top-down view in FIG. 11b, the entire opening 8 is illustrated and shows a large triangular shaped region on the right wherein the second PG portion will be formed, and a small rectangular region on the left wherein the peg will be formed. The rectangular opening is preferably longer than desired for the peg length since the eventual ABS 4-4 will be formed later in a lapping procedure after completing the write head fabrication process. The lapping process will remove a section of the rectangular shaped PG region that is not between the ABS and second PG portion. Sidewalls 18s1 in the peg shaped portion of the opening connect to sidewalls 18s2 in the triangular shaped portion of the cavity. Sidewalls 18s2 are also connected to back sidewall 18s3. Plane B-B in FIG. 11b is used to generate the cross-sectional views in FIGS. 12b-15b after subsequent steps are performed.

Figure 12A:
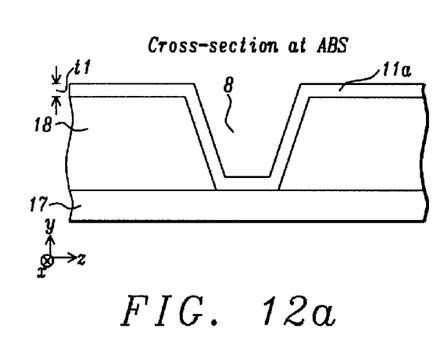
Figure 12B:
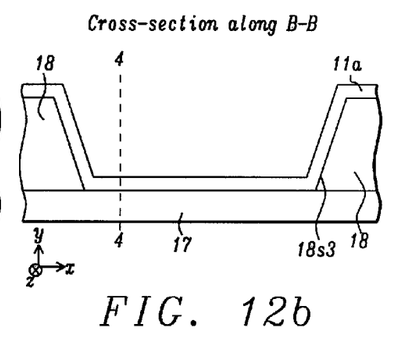

Referring to FIG. 12a, the next step in the cavity process to form a laminate of non-planar X and Y layers is to deposit a first metal X layer 11a with a thickness t1. A sputter deposition method with a rotating substrate may be employed to form a conformal coating 11a in opening 8 and on a top surface of cladding layer 18. FIG. 12b offers a different perspective that is a cross-sectional view along the plane B-B. Preferably, layer 11a (and subsequently deposited X and Y layers) forms an equivalent thickness on sidewalls 18s1 along the peg shaped opening in FIG. 12a, on sidewall 18s3 along a back side of the opening in FIG. 12b, and along sidewalls 18s2 (FIG. 10b) that connect a peg sidewall to the back sidewall.

Figure 13A:
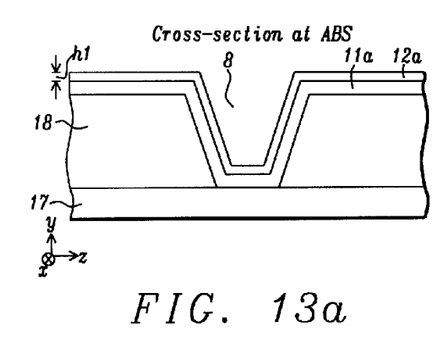
Figure 13B:
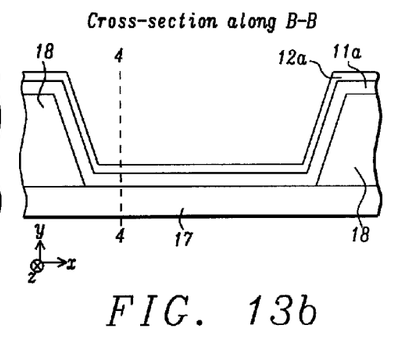

In FIG. 13a-13b, a first Y material layer 12a with a thickness h1 where h1<t1 is deposited on the first X layer 11a, and preferably conforms to the shape of the sidewalls 18s1-18s3. Preferably, the Y layer deposition occurs in the same sputter deposition chamber as used for the X layer deposition to facilitate a high throughput. However, the X and Y layer depositions may also be performed in different chambers within the same sputter deposition mainframe.

Figure 14A:
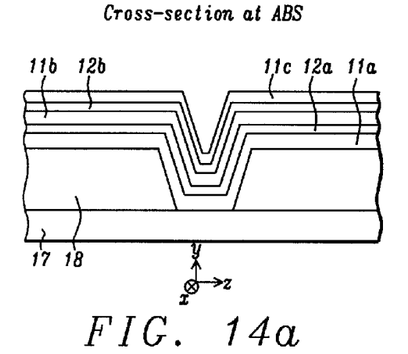
Figure 14B:
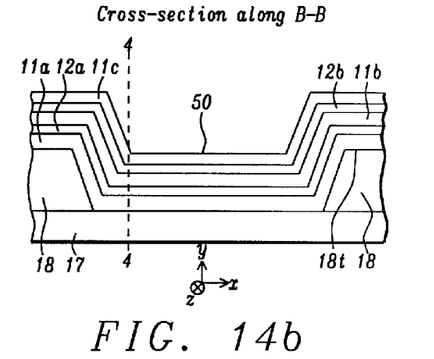

As illustrated in FIG. 14a-14b, the X and Y layer deposition steps are repeated in alternating fashion until a desired number of layers is deposited, and the opening 8 is completely filled with X and Y material. In the exemplary embodiment, a second X layer 11b, a second Y layer 12b, and a third X layer 11c are successively laid down on the first Y layer 12a. As a result, the center section 50 of the uppermost layer 11c in FIG. 14b is a greater distance from substrate 17 than a top surface 18t of the cladding layer. In one embodiment, the bottommost layer is an X layer and the final layer laid down is a Y layer. However, both of the bottommost and uppermost layers in the laminated stack may have an X metal composition as shown in FIG. 14a. The number of X and Y layers required to fill the cavity 8 is determined by the thickness of cladding layer 18, and the desired thicknesses of the multiple X and Y layers. Preferably, a thickness t2 of a second X layer is greater than thickness h2 of a second Y layer, and so forth up to thickness to for an "nth" X layer is greater than thickness hn for an "nth" Y layer.

Figure 15A:
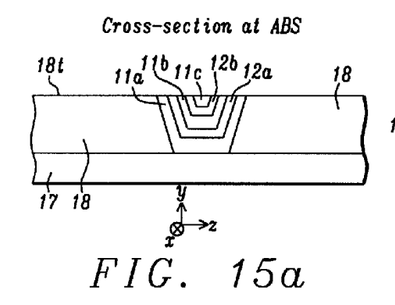
FIGS. 15*a* and 15*b* are a cross-sectional view and top-down view, respectively, after a chemical mechanical polish process is performed to planarize the laminated PG structure according to a first embodiment of the present disclosure.
Figure 15B:
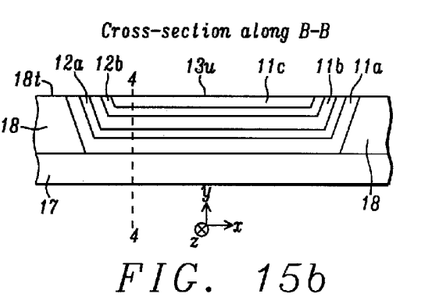

Referring to FIG. 15a-15b, a final step in the fabrication of a laminated PG structure of the present disclosure is a chemical mechanical polish (CMP) procedure that is well known in the art and forms a top PG surface 13u that is coplanar with the cladding layer top surface 18t. All X and Y layers formed above top surface 18t are removed by this process. Preferably, the CMP process is optimized so that the PG layers, and especially the uppermost layer 11c, has an erosion rate similar to that of the cladding layer to avoid the formation of an indentation in upper surface 13u.

Figure 16A:
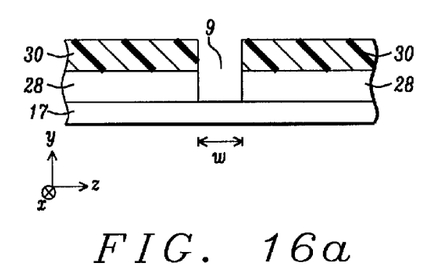
Figure 16B:
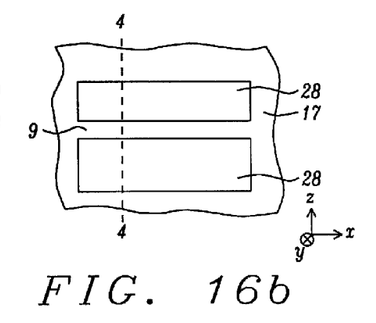

A process sequence for fabricating the non-planar PG according to a second embodiment of the present disclosure is depicted in FIG. 16a-21b. Referring to FIG. 16a, a first step in the process sequence involves depositing a dielectric layer 28 on gap layer 17. A first photoresist layer 30 is formed on the dielectric layer and is patterned by a conventional lithography process to form an opening 9 therein that is transferred through the underlying dielectric layer by a reactive ion etch (RIE) step. The RIE step generates the opening 9 in the dielectric layer and thereby uncovers a portion of gap layer 17. The opening is rectangular with a cross-track dimension w. The eventual position of the ABS 4-4 is shown and will be determined after a subsequent lapping process after all write head layers are formed. The cross-sectional view in FIG. 16a is obtained along the plane 4-4 in FIG. 16b which is a top-down view after the first photoresist layer is removed.

Figure 17A:
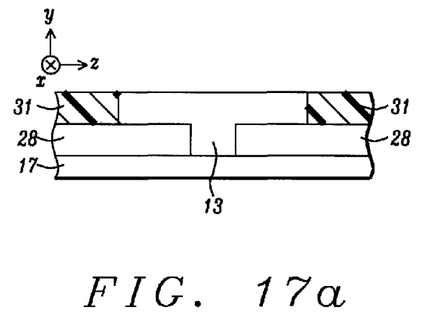

Referring to FIG. 17a, a cross-sectional view of the structure in FIG. 16a is shown following a process wherein a second photoresist layer 31 is coated on dielectric layer 28 and is patterned by a lithography process to generate a second opening (not shown) in the second photoresist layer above opening 9. The first opening 9 and the second opening are then filled with the laminated rod-like layer 13 comprised of non-planar X and Y layers according to a process sequence illustrated in FIG. 11a-14b. Thereafter, the second photoresist layer may be stripped by a standard method.

Figure 17B:
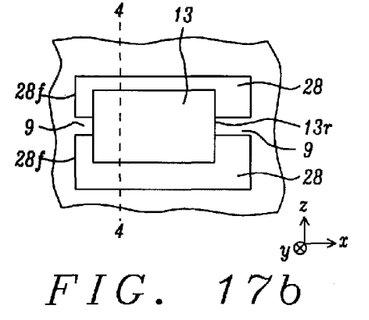

In FIG. 17b, a top-down view of the partially formed PG in FIG. 17a is depicted after the second photoresist layer is removed. The back end 13r of laminated layer 13 is aligned parallel to the plane of the eventual ABS. A section of opening 9 near the front end 28f of the dielectric layer and behind the back end of laminated layer 13 may remain in place following the deposition of layer 13. However, a substantial portion of the trench opening 9 is filled with layer 13 including a region through which the ABS will be formed in a subsequent step.

Figure 18A:
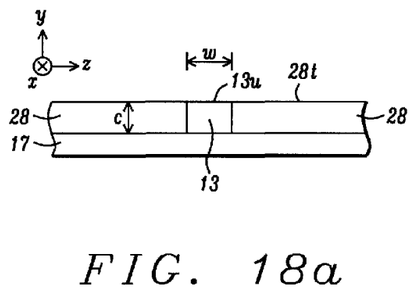
Figure 18B:
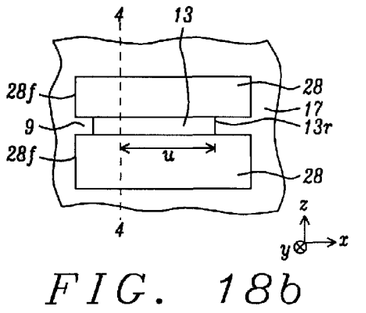

Referring to FIG. 18a, a cross-sectional view of the structure in FIG. 17a is depicted following a CMP process that is performed to remove the portion of layer 13 above dielectric layer 28. As a result, a rod-like shape is formed for layer 13 with a top surface 13u that is coplanar with a top surface 28t of the dielectric layer 28. In addition, thickness c and cross-track width dimension w are defined. From a top-down view in FIG. 18b, the rod like layer 13 is shown with a back end 13r that is a distance u from the eventual ABS 4-4.

Figure 19A:
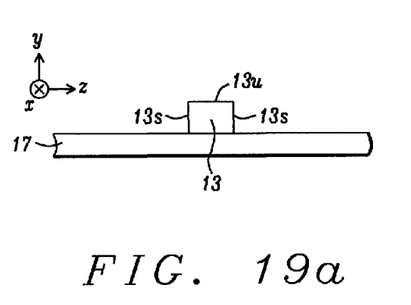
Figure 19B:
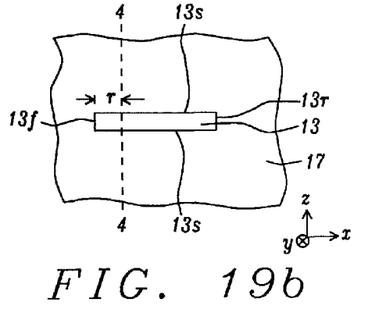

Referring to the cross-sectional view in FIG. 19a, dielectric layer 28 surrounding rod-like layer 13 is removed by a RIE process or the like to leave a free standing layer 13 having sidewalls 13s and top surface 13u. The method of removing dielectric layer 28 may comprise a treatment to clean the surface of gap layer 17 to remove any residue caused by the RIE process. The top-down perspective in FIG. 19b shows a front end 13f, back end 13r, and parallel sides 13s. A portion of rod-like layer 13 having a lengthwise dimension r along an x-axis direction between front end 13f and the eventual plane of ABS 4-4 will be removed during a later lapping process.

Figure 20A:
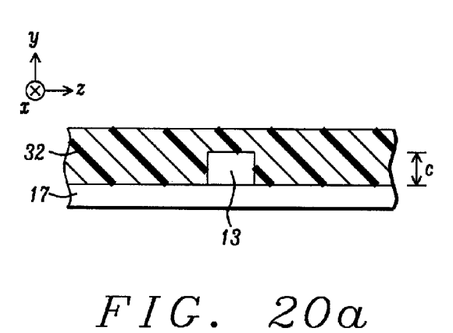
Figure 20B:
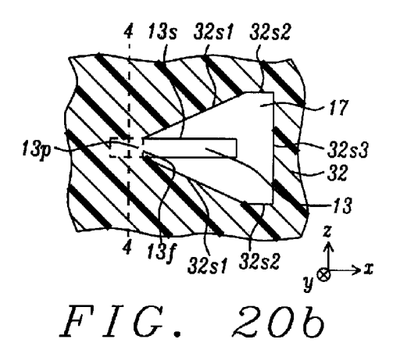

Referring to FIG. 20a, a third photoresist layer 32 is coated with a thickness greater than c so that the photoresist layer completely covers rod-like layer 13. In a top-down view shown in FIG. 20b, the third photoresist layer 32 is patterned by a lithography process to form an opening that uncovers all of rod-like layer 13 except a front section where peg 13p will be located. The opening is bounded in part by sides 32s1 that converge along sides 13s at front end 13f. Each side 32s1 connects with a side 32s2 that is aligned in an x-axis direction perpendicular to the ABS and terminates at a back end side 32s3. The opening uncovers a portion of gap layer 17 and has a shape that defines the desired shape and size of the metal X layer to be deposited in a following step. In an alternative embodiment, sides 32s2 may be omitted so that sides 32s1 end at back side 32s3.

Figure 21A:
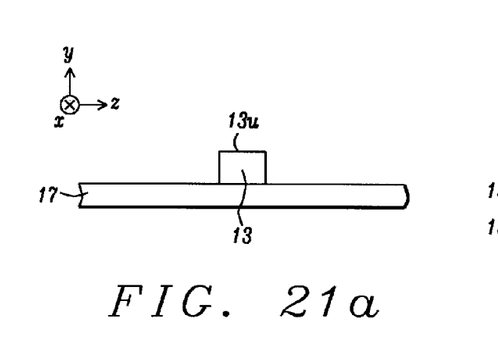
Figure 21B:
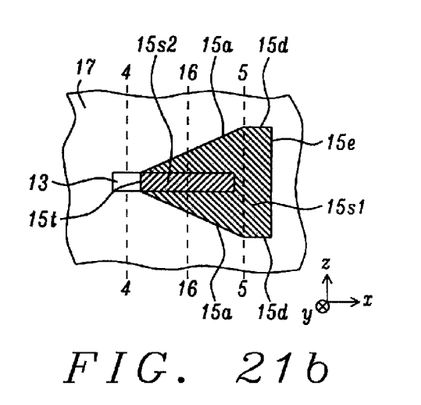

Referring to FIG. 21a, the metal X layer 15 is deposited by a plating technique, sputter deposition process, or the like. Thereafter, the third photoresist layer 32 is removed by a lift off process, for example. Metal X layer 15 remains only within the opening bounded by sides 32s1-32s3 in the previous step and thereby defines sides 15a, 15d, and back side 15e shown in the top-down view in FIG. 21b. A small portion 15u2 of metal X layer's top surface is formed over rod-like layer 13 while a major portion 15u1 of the top surface does not cover the rod-like layer. As indicated previously, the present disclosure anticipates an alternative embodiment wherein the rectangular portion between plane 5-5 and back side 15e is omitted. A triangular shaped portion of layer 15 is bounded by front side 15t, sides 15a, and the plane 5-5 where the cross-sectional dimension of layer 15 reaches a maximum value. The peg portion (not shown) of the rod-like layer 13 will be formed between ABS 4-4 and front side 15t in a subsequent lapping step and is not covered by the metal X layer.

The present disclosure has an advantage over the prior art in that it provides a PG design with a scalable peg size and improved reliability compared with the prior art. The cavity process described herein is versatile in that the fabrication sequence may be confined to a planar PG structure, or may be modified to a non-planar PG where the bulk of the PG consists of a noble metal layer with high optical efficiency and low resistive heating that overlays on a laminated rod layer having an exposed peg at the ABS. The overall sequence in both method embodiments is compatible with existing magnetic head fabrication techniques.

While this disclosure has been particularly shown and described with reference to, the preferred embodiment thereof, it will be understood by those skilled in the art that various changes in form and details may be made without departing from the spirit and scope of this disclosure.

We claim:

1. A plasmon generator (PG) having a planar bottom surface and a planar top surface, and with a first thickness in a down-track direction, and that propagates light energy from a light source towards an air bearing surface (ABS) in a write head, a portion of the light energy is coupled to a surface plasmon mode along sidewalls and the planar bottom surface of the PG, the surface plasmon mode is propagated to a peg portion of the PG at the ABS and projected as an optical spot on a magnetic medium and thereby provides localized heating to facilitate a write process, the PG comprises a plurality of non-planar layers each having a center section formed parallel to the planar bottom PG surface that is aligned in a plane that is perpendicular to the down-track direction, and side sections each formed parallel to a nearest PG sidewall, the plurality of non-planar layers comprises:
  (a) a plurality of "n" X layers where X is one of Au, Ag, Cu, Al, or alloys thereof with Co or Ni; and
  (b) a plurality of "n" or "n−1" Y layers where Y is a metal that is one of Ru, Cr, Pd, Pt, Ti, W, Ta, Mg, Fe, Co, Ni, Cu, Zr, Y, or a dielectric material that is one of $Ta_2O_5$, $Al_2O_3$, $SiO_2$, SiON, $Si_3N_4$, $Ti_2O_5$, and $HfO_2$ wherein X and Y layers are formed in an alternating design beginning with a bottommost first X layer, and each X layer has a thickness that is greater than a thickness of an overlying Y layer.

2. The plasmon generator of claim 1 wherein the peg portion has a front end at the ABS, a second end that is recessed from the ABS by about 5 to 150 nm, and two parallel sides that extend from the front end to the second end and connect the PG top surface with the PG bottom surface in the peg portion.

3. The plasmon generator of claim 1 wherein the PG includes a second portion that extends from the second end of the peg portion to a back side of the PG, the second portion has two sides that are separated by increasing distance in a cross-track direction with increasing distance from the second end of the peg portion.

4. The plasmon generator of claim 3 wherein the second PG portion has a substantially parabolic shape or a substantially triangular shape from a top-down view along a down-track direction.

5. The plasmon generator of claim 1 wherein the peg portion has a square, rectangular, or trapezoidal shape from an ABS view.

6. The plasmon generator of claim 1 wherein a thickness t1 of the bottommost first X layer is greater than a thickness of other X layers.

7. The plasmon generator of claim 1 wherein a thickness t1 of the bottommost first X layer is at least 20 nm.

8. The plasmon generator of claim 1 wherein each of the plurality of "n" X layers has a thickness in a range of about 5 nm to 70 nm, and each of the plurality of "n" or "n−1" Y layers has a thickness in a range of about 0.1 to 10 nm.

9. The plasmon generator of claim 1 wherein the PG has a plurality of sidewalls wherein each sidewall is formed at an angle between 45 degrees and 90 degrees with respect to the bottom PG surface.

10. The plasmon generator of claim 1 wherein the first thickness of the PG is from about 20 nm to 150 nm.

11. A thermally assisted magnetic recording (TAMR) head comprising:
  (a) a write pole having a leading edge and a trailing edge formed along an air bearing surface (ABS), said leading edge and trailing edge are part of a leading side and trailing side, respectively, that are connected by two sides to define a cross-track width along each of the leading and trailing edges, the TAMR head including the write pole, a plasmon generator (PG) with planar top and bottom surfaces and sidewalls, and a waveguide move in a down-track direction over a magnetic medium during a write process;
  (b) the waveguide that captures light energy from a light source and propagates the light energy toward an end of the waveguide at the ABS, the waveguide has a top surface that faces the write pole and is separated from the planar bottom PG surface by a first gap distance; and
  (c) the PG that is formed between the waveguide and the write pole, the PG couples light energy from the waveguide to a surface plasmon mode along the planar bottom PG surface and sidewalls, the surface plasmon mode is propagated to an end of a peg portion of the PG at the ABS and is then projected as an optical spot onto a localized region of the magnetic medium thereby heating the localized region and reducing its magnetic coercivity and anisotropy to facilitate a write process, the PG has a plurality of non-planar layers each having a center section formed parallel to the planar bottom PG surface that is aligned in a plane that is perpendicular to the down-track direction, and side sections each formed parallel to a nearest PG sidewall, the plurality of non-planar PG layers comprises:
  (1) a plurality of "n" X layers where X is one of Au, Ag, Cu, Al, or alloys thereof with Co or Ni; and
  (2) a plurality of "n" or "n−1" Y layers where Y is a metal that is one of Ru, Cr, Pd, Pt, Ti, W, Ta, Mg, Fe, Co, Ni, Cu, Zr, Y, or a dielectric material that is one of $Ta_2O_5$, $Al_2O_3$, $SiO_2$, SiON, $Si_3N_4$, $Ti_2O_5$, and $HfO_2$ wherein X and Y layers are formed in an alternating design beginning with a first X layer at the bottom PG surface, and each X layer has a thickness that is greater than a thickness of an overlying Y layer.

12. The TAMR head of claim 11 wherein the PG sidewalls connect the planar bottom PG surface to the planar top surface and each sidewall is formed at an angle between about 45 degrees and 90 degrees with respect to the planar PG bottom surface.

13. The TAMR head of claim 11 wherein the first gap distance is from about 5 to 50 nm, and a second gap distance between a top surface of the PG and the leading side of the write pole is between about 5 and 80 nm.

14. The TAMR head of claim 11 wherein the peg portion has a front end at the ABS, a second end that is recessed from the ABS by about 5 to 150 nm, and two parallel sides that extend from the front end to the second end and connect the PG top surface with the PG bottom surface in the peg portion.

15. The TAMR head of claim 11 further comprised of a side heat sink adjoining each of the two write pole sides, and a top heat sink contacting the trailing side of the write pole and a portion of a top surface of the two side heat sinks along the ABS.

16. The TAMR head of claim 14 wherein the PG includes a second portion that extends from the second end of the peg portion to a back side of the PG, the second portion has two sides that are separated by increasing distance in a cross-track direction with increasing distance from the second peg end.

17. The TAMR head of claim 11 wherein a thickness t1 of the first X layer is greater than a thickness of other X layers.

18. The TAMR head of claim 11 wherein a thickness t1 of the first X layer is at least 20 nm.

19. The TAMR head of claim 11 wherein each of the plurality of X layers has a thickness in a range of about 5 nm to 70 nm, and each of the plurality of Y layers has a thickness in a range of about 0.1 to 10 nm.

20. The TAMR head of claim 12 wherein the PG has a down-track thickness between the top and bottom planar surfaces from about 20 to 150 nm.

21. A plasmon generator (PG) having a planar bottom surface and sidewalls that propagate light energy from a light source towards an air bearing surface (ABS) in a write head, a portion of the light energy is coupled to a surface plasmon mode along the sidewalls and the planar bottom surface of the PG, the surface plasmon mode is propagated to an end of a peg portion of the PG at the ABS and projected as an optical spot on a magnetic medium to provide localized heating during a write process, the PG comprises:
  (a) a first layer that includes the peg with an end at the ABS and a second end recessed from the ABS, the first and second ends are connected by two parallel sides extending in a lengthwise direction a first distance perpendicular to the ABS, and by a planar top surface formed parallel to the bottom PG surface, the first layer has a cross-track width, a first thickness in a down-track direction, and includes a plurality of non-planar layers each having a center section formed parallel to the planar bottom surface and side sections formed substantially parallel to a nearest PG sidewall, the first layer comprises;
 (1) a plurality of "n" X layers where X is one of Au, Ag, Cu, Al, or alloys thereof with Co or Ni; and
 (2) a plurality of "n" or "n−1" Y layers where Y is a metal that is one Ru, Cr, Pd, Pt, Ti, W, Ta, Mg, Fe, Co, Ni, Cu, Zr, Y, or a dielectric material that is one of $Ta_2O_5$, $Al_2O_3$, $SiO_2$, SiON, $Si_3N_4$, $Ti_2O_5$, and $HfO_2$ wherein X and Y layers are formed in an alternating manner beginning with a bottommost first X layer, and each X layer has a thickness that is greater than a thickness of an overlying Y layer; and
 (b) a second layer made of a noble metal that covers the planar top surface and two parallel sides of the first layer except over the peg portion, the second layer has a bottom surface that together with a bottom surface of the first metal layer form the planar bottom PG surface, and has sidewalls that are the PG sidewalls.

22. The plasmon generator of claim 21 wherein the second metal layer is made of one of Au, Ag, Cu, Al, or alloys thereof with Co or Ni.

23. The plasmon generator of claim 21 wherein the peg portion extends a distance of about 5 to 150 nm from the ABS to the second end of the peg portion.

24. The plasmon generator of claim 23 wherein the second layer extends from the second end of the peg portion to a back side of the PG, the second layer has two sides that are separated by increasing distance in a cross-track direction with increasing distance from the second end of the peg portion.

25. The plasmon generator of claim 21 wherein the second layer has a non-planar top surface including a first section formed over the first layer that is a greater distance from the planar bottom PG surface than a second section that is not formed over the first layer.

26. The plasmon generator of claim 21 wherein a thickness t1 of the bottommost first X layer is greater than a thickness of other X layers.

27. The plasmon generator of claim 21 wherein a thickness t1 of the bottommost first X layer is at least 20 nm.

28. The plasmon generator of claim 21 wherein each of the plurality of X layers has a thickness in a range of about 5 nm to 70 nm, and each of the plurality of Y layers has a thickness in a range of about 0.1 to 10 nm.

29. A thermally assisted magnetic recording (TAMR) head comprising:
 (a) a write pole having a leading edge and a trailing edge formed along an air bearing surface (ABS), said leading edge and trailing edge are part of a leading side and trailing side, respectively, that are connected by two sides to define a cross-track width along each of the leading and trailing edges, the TAMR head including the write pole, a plasmon generator (PG) with a planar bottom surface and sidewalls, and a waveguide move in a down-track direction over a magnetic medium during a write process;
 (b) the waveguide that captures light energy from a light source and propagates the light energy toward an end of the waveguide at the ABS, the waveguide has a top surface that faces the write pole and is separated from the planar bottom PG surface by a first gap distance; and
 (c) the PG that is formed between the waveguide and the write pole, the PG couples light energy from the waveguide to a surface plasmon mode along the planar bottom PG surface and sidewalls, the surface plasmon mode is propagated to a first end of a peg portion of the PG at the ABS and is then projected as an optical spot onto a localized region of the magnetic medium thereby heating the localized region and reducing its magnetic coercivity and anisotropy to facilitate a write process, the PG comprises:
 (a) a first layer that includes the peg portion having the first end at the ABS and a second end recessed from the ABS, the first and second ends are connected by two parallel sides extending in a lengthwise direction a first distance perpendicular to the ABS, and by a planar top surface formed parallel to the planar bottom PG surface, the first layer has a cross-track width, a first thickness in a down-track direction, and includes a plurality of non-planar layers each having a center section formed parallel to the planar bottom PG surface and side sections formed substantially parallel to a nearest PG sidewall, the first layer comprises
 (1) a plurality of "n" X layers where X is one of Au, Ag, Cu, Al, or alloys thereof with Co or Ni; and
 (2) a plurality of "n" or "n−1" Y layers where Y is a metal that is one of Ru, Cr, Pd, Pt, Ti, W, Ta, Mg, Fe, Co, Ni, Cu, Zr, Y, or a dielectric material that is one of $Ta_2O_5$, $Al_2O_3$, $SiO_2$, SiON, $Si_3N_4$, $Ti_2O_5$, and $HfO_2$ wherein X and Y layers are formed in an alternating design beginning with a first X layer at the planar bottom PG surface, and each X layer has a thickness that is greater than a thickness of an overlying Y layer; and
 (b) a second layer made of a noble metal that covers the planar top surface and two parallel sides of the first metal layer except over the peg portion, the second metal layer has a bottom surface that together with a bottom surface of the first layer form the planar bottom PG surface, and has sidewalls that are the PG sidewalls.

30. The TAMR head of claim 29 wherein the second end of the peg portion is recessed from the ABS by about 5 to 150 nm.

31. The TAMR head of claim 29 further comprised of a side heat sink adjoining each the two write pole sides, and a top heat sink contacting the trailing side of the write pole and a portion of a top surface of the two side heat sinks along the ABS.

32. The TAMR head of claim 30 wherein the second layer extends from the second peg end to a back side of the PG, the second layer has two sides that are separated by increasing distance in a cross-track direction with increasing distance from the second peg end.

33. The TAMR head of claim 29 wherein the second layer is made of one of Au, Ag, Cu, Al, or alloys thereof with Co or Ni.

34. The TAMR head of claim 29 wherein a thickness t1 of the first X layer is greater than a thickness of other X layers.

35. The TAMR head of claim 29 wherein a thickness t1 of the first X layer is at least 20 nm.

36. The TAMR head of claim 29 wherein each of the plurality of X layers has a thickness in a range of about 5 nm to 70 nm, and each of the plurality of Y layers has a thickness in a range of about 0.1 to 10 nm.

37. A method of fabricating a planar plasmon generator (PG) with a first down-track thickness in a TAMR head, comprising:
 (a) providing a dielectric layer on a substrate, and forming an opening in the dielectric layer with sidewalls and a planar bottom surface wherein a lengthwise dimension of the opening is in a direction perpendicular to a plane that will subsequently become the air bearing surface (ABS), a widthwise dimension is a cross-track direction, and the opening exposes a portion of the substrate;

(b) depositing a first X layer having a thickness t1 on the planar bottom surface and sidewalls of the opening where X is one of Au, Ag, Cu, Al, or alloys thereof with Co or Ni;

(c) depositing a first Y layer having a thickness h1 on the first X layer and where h1<t1, the first Y layer is a metal that is one of Ru, Cr, Pd, Pt, Ti, W, Ta, Mg, Fe, Co, Ni, Cu, Zr, Y, or a dielectric material that is one of $Ta_2O_5$, $Al_2O_3$, $SiO_2$, SiON, $Si_3N_4$, $Ti_2O_5$, and $HfO_2$;

(d) repeating the X layer and Y layer deposition in alternating fashion until a plurality of "n" X layers, and a plurality of "n" or "n−1" Y layers are formed and completely fill the opening, each of the X layers has a thickness greater than a thickness of an overlying Y layer and each of the X and Y layers is non-planar with a center section formed parallel to the planar bottom surface and side sections that are substantially parallel to a nearest sidewall of the dielectric layer; and (e) performing a chemical mechanical polish (CMP) process to remove the X and Y layers formed above a top surface of the dielectric layer, the CMP process forms a laminated PG structure with a top surface that is coplanar with the dielectric layer top surface, and the PG comprises:

(1) a peg portion with two parallel sidewalls aligned perpendicular to the ABS plane and that connect a first peg end at the ABS plane to a second peg end recessed toward a back side of the PG; and (2) a second portion with two sides that extend from the second peg end toward the back side of the PG and are separated by increasing distance in a cross-track direction with increasing distance from the second peg end.

38. The method of claim 37 wherein the second PG portion has a substantially parabolic shape or a substantially triangular shape from a top-down view along a down-track direction.

39. The method of claim 37 wherein the second peg end is recessed about 5 to 150 nm from the ABS plane.

40. The method of claim 37 wherein a thickness t1 of the first X layer is greater than a thickness of other X layers.

41. The method of claim 37 wherein a thickness t1 of the first X layer is at least 20 nm.

42. The method of claim 37 wherein each of the plurality of X layers has a thickness in a range of about 5 nm to 70 nm, and each of the plurality of Y layers has a thickness in a range of about 0.1 to 10 nm.

43. The method of claim 37 wherein the opening has sidewalls formed at an angle between 45 degrees and 90 degrees with respect to the planar bottom surface.

44. The method of claim 37 wherein the first down-track PG thickness is from about 20 nm to 150 nm.

45. A method of fabricating a plasmon generator in a TAMR head, comprising:

(a) providing a first dielectric layer on a substrate, and forming a trench with sidewalls and a bottom surface in the first dielectric layer wherein a lengthwise dimension of the trench is in a direction perpendicular to a plane that will subsequently become the air bearing surface (ABS), and the trench exposes a portion of the substrate;

(b) depositing a plurality of "n" non-planar X layers and "n" or "n−1" non-planar Y layers in alternating fashion on the sidewalls and the bottom surface to a level that fills the trench along a substantial portion thereof including a region at the ABS plane, each X layer is one of Au, Ag, Cu, Al, or alloys thereof with Co or Ni, and each Y layer is a metal that is one of Ru, Cr, Pd, Pt, Ti, W, Ta, Mg, Fe, Co, Ni, Cu, Zr, Y, or a dielectric material that is one of $Ta_2O_5$, $Al_2O_3$, $SiO_2$, SiON, $Si_3N_4$, $Ti_2O_5$, and $HfO_2$ wherein each X layer has a thickness that is greater than a thickness of an overlying Y layer;

(c) performing a chemical mechanical polish (CMP) process to form a rod-like laminated layer with a planar top surface that is coplanar with a top surface of the dielectric layer, the rod-like laminated layer includes a peg portion with an end at the ABS plane with a first thickness in a down-track direction, and a width in a cross-track direction between two parallel sidewalls;

(d) removing the first dielectric layer by an etch technique to leave the rod-like laminated layer on the substrate, the rod-like laminated layer has a rectangular shape from a top-down view wherein the two parallel sides connect a front end proximate to the ABS plane to a back end;

(e) forming a photoresist layer on the rod-like laminated layer and then patterning to form an opening in a desired shape of a subsequently deposited second layer, the opening exposes a portion of the substrate along a substantial section of two parallel sides and back end of the rod-like laminated layer but the photoresist layer remains over the peg portion;

(f) depositing the second layer made of a noble metal on exposed regions of the rod-like laminated layer and on exposed portions of substrate; and (g) removing the photoresist layer to leave a PG comprised of a rod-like laminated layer with an exposed peg portion, and the second layer with a first section formed above the top surface of the rod-like laminated layer and side portions formed along the two parallel sides that each have a bottom surface that is coplanar with a bottom surface of the rod-like laminated layer to form a planar bottom PG surface.

46. The method of claim 45 further comprised of lapping the PG to form an end of the peg portion at the ABS plane, the peg portion extends a distance of about 5 to 150 nm from the ABS to a second end of the peg portion.

47. The method of claim 45 wherein the planar bottom PG surface faces a top surface of a waveguide and is separated therefrom by a gap distance of about 5 to 50 nm.

48. The method of claim 45 wherein the second layer is made of Au, Ag, Cu, Al, or an alloy thereof with Co or Ni.

49. The method of claim 45 wherein the first thickness in a down-track direction of the rod-like laminated layer is from about 20 to 150 nm.

50. The method of claim 46 wherein the second layer is comprised of two sides that extend from the second peg end toward a back side of the PG, and are separated with increasing distance in a cross-track direction with increasing distance from the second end of the peg portion.

51. The method of claim 45 wherein a thickness t1 of a first X layer is greater than a thickness of other X layers.

52. The method of claim 45 wherein a thickness t1 of a first X layer is at least 20 nm.

53. The method of claim 45 wherein each of the plurality of X layers has a thickness in a range of about 5 nm to 70 nm, and each of the plurality of Y layers has a thickness in a range of about 0.1 to 10 nm.

54. The method of claim 45 wherein the second layer has a section of top surface above the rod-like laminated layer that is a greater distance from the planar bottom PG surface than sections of top surface above the side portions of the rod-like laminated layer.

* * * * *